United States Patent Office 2,802,734
Patented Aug. 13, 1957

2,802,734

MEDIA FOR DISPERSING GLASS FIBERS

David Bandel and William K. W. Chen, Stamford, Conn., assignors to American Machine & Foundry Company, a corporation of New Jersey No Drawing. Application December 23, 1954, Serial No. 477,400

11 Claims. (Cl. 92—3)

This invention relates to the preparation of a fluid dispersion of glass fibers suitable for paper making. Particularly, the invention relates to the dispersion of glass fibers in an aqueous polyacid media.

The use of strong mineral acids as an aid in suspending glass fibers for paper making is known. However, it has not been practical to beat fibers in strong mineral acids, since the pH range in which good floc free dispersions can be made with these acids is about 1.5 to 2.5. Such acid solutions are highly corrosive, even towards stainless steel. Corrosion produced by this type of beating has resulted in damage to the beating equipment and to the paper making wire and in contamination of finished paper and film by iron and other impurities from the beating equipment and sheet forming wire. This contamination is sometimes evident as a reddish discoloration in the finished product. The electrical properties of finished paper such as power factor and resistivity are adversely affected by these contaminants.

It is known that the use of an acid medium is advantageous during the actual fiber beating process when corrosion of equipment can be minimized because the acid produces a more uniform suspension. Moreover, beating time is reduced by the presence of acid and longer, better dispersed fibers are produced in this way. The paper is also substantially free of fiber bundles or flocs. The use of an acid beating medium results in an extremely uniform and smooth dispersion, and in a high quality uniform glass paper. Smooth thin glass fiber paper free of fiber bundles is a valuable structural base adapted to the formation of high quality electrical insulation.

Accordingly, it is an object of this invention to provide a method of dispersing glass fibers in a non-corrosive acid aqueous medium for the preparation of substantially smooth glass paper.

A further object of this invention is to provide a method of preparing a suspension of glass fibers suitable for paper making which gives a finished glass paper free of ionic impurities and which is highly suitable for electrical insulating applications.

According to this invention excellent fiber dispersions of high uniformity and stability can be prepared at higher pH values (about 2.5 to 4.5) than is possible with strong mineral acids if a polyacid, inorganic or organic, is used to acidify the medium in which the fiber is beaten. This discovery eliminates many disadvantages inherent in the use of strong corrosive mineral acids at low pH values. In particular, phosphoric acid is highly suited as a weak inorganic polyacid and citric acid as a weak organic polyacid. Another polyacid that can be used is carboxymethyl cellulose free acid also known as cellulose glycolic acid.

These and other objects and advantages of the invention are more fully described by the following examples.

*Example 1*

In a preferred example of the invention one and a half grams of three quarter micron glass fiber were added to half a liter of water in which 0.15 gram of citric acid was dissolved. The mixture was beaten for fifteen minutes in a "Waring Blendor" and produced a good dispersion which made satisfactory paper. The pH before beating was 3.14 and after beating, as a result of acid reactions with sodium oxide leached from the glass, had risen to 4.25. Similarly, citric acid works in concentrations from 0.005% to 0.1% or more.

*Example 2*

Under the conditions of Example 1, 0.4 gram of phosphoric acid was used. The initial pH was 3.08 and the final pH was 4.35. Similarly, phosphoric acid works in concentrations from 0.01% to 0.1% or more.

*Example 3*

Under the conditions of Example 1, 0.75 gram of cellulose glycolic acid was used. The initial pH was 3.24 and the final pH was 3.68. Similarly, cellulose glycolic acid works in concentrations of 0.1% to 2.3% or more.

*Example 4*

Various mixtures of polyacids are also useful. Under the conditions of Example 1, 0.25 gram of citric acid and 0.75 gram of cellulose glycolic acid were used. The initial pH was 3.08 and the final pH was 3.90. Combinations of citric acid between 0.0025% and 0.03% with cellulose glycolic acid between 0.05% and 0.15% give good dispersions.

In the manufacture of paper the glass fiber stock is flowed over a paper making wire as taught by the copending patent application of Hungerford and Yarze, S. N. 293,092, filed February 12, 1952, and now abandoned. Variations in the chemical composition of glass fibers require some variation in the acidity of the suspending media.

All of these examples gave a similar floc free paper and polyacid aqueous dispersions of glass fibers prepared according to the methods of this invention were made into paper which had many desirable electrical characteristics. The organic acids made dispersions particularly useful for electrical applications since the acids were readily burned off to leave pure glass fibers. Moreover, there was less corrosion of equipment than occurs when beating is done with strong mineral acids. All of these preparations produced paper which was as smooth and floc free as paper made using 0.15% sulfuric acid which is highly corrosive. Lumpy spots, caused by bundles of fibers, on the paper surface are therefore avoided. This smooth paper of uniform thickness is especially useful as a very thin base which can be coated uniformly with resin to form a valuable electrical insulating barrier.

There have thus been described methods for preparing improved aqueous media for dispersing glass fibers to be used in paper making. Paper made from dispersions prepared according to this invention has electrical insulating characteristics superior to those of paper made by other known methods.

What is claimed is:

1. A method of forming an aqueous acid dispersion of glass fibers for paper making which comprises beating said fibers in an aqueous medium brought to a pH between 2.5 and 4.5 before beating by the presence of an organic polyacid.

2. A method of forming an aqueous acid dispersion of glass fibers for paper making which comprises beating said fibers in an aqueous medium brought to a pH between 2.5 and 4.5 by the presence of an acid selected from the group consisting of phosphoric acid, citric acid and cellulose glycolic acid.

3. A method of forming an aqueous acid dispersion of glass fibers for paper making which comprises beating said fibers in an aqueous medium brought to a pH between 2.5 and 4.5 by the presence of phosphoric acid.

4. A method of forming an aqueous acid dispersion of glass fibers for paper making which comprises beating said fibers in an aqueous medium brought to a pH between 2.5 and 4.5 by the presence of citric acid.

5. A method of forming an aqueous acid dispersion of glass fibers for paper making which comprises beating said fibers in an aqueous medium brought to a pH between 2.5 and 4.5 by the presence of cellulose glycolic acid.

6. A method of forming an aqueous acid dispersion of glass fibers for paper making which comprises beating said fibers in a quantity of water to which between 0.01% and 0.1% phosphoric acid has been added.

7. A method of forming an aqueous acid dispersion of glass fibers for paper making which comprises beating said fibers in a quantity of water to which between 0.005% and 0.1% citric acid has been added.

8. A method of forming an aqueous acid dispersion of glass fibers for paper making which comprises beating said fibers in a quantity of water to which between 0.1% and 2.3% cellulose glycolic acid has been added.

9. A method of forming an aqueous acid dispersion of glass fibers for paper making which comprises beating said fibers in a quantity of water to which about 0.05% citric acid and about 0.15% cellulose glycolic acid has been added.

10. A method of forming an aqueous acid dispersion of glass fibers for paper making which comprises beating said fibers in a quantity of water to which 0.0025% to 0.03% citric acid and 0.05% to 0.15% cellulose glycolic acid has been added.

11. An aqueous glass fiber dispersion made by the method of claim 1.

References Cited in the file of this patent

UNITED STATES PATENTS

| | | |
|---|---|---|
| 2,491,761 | Parker | Dec. 20, 1949 |
| 2,626,214 | Osborne | Jan. 20, 1953 |
| 2,658,848 | Labino | Nov. 10, 1953 |
| 2,706,156 | Arledter | Apr. 12, 1955 |

OTHER REFERENCES

Fain: "Surface Activity of Solid Emulsifiers," Ind. and Eng. Chem., pp. 48–50, January 1939.

O'Leary: "Effects of Mechanical Preparation and pH on the Strength of Glass Fiber Paper," from Tappi, vol. 37, No. 10, pp. 446–450, October 1954.